US012647326B2

(12) United States Patent (10) Patent No.: US 12,647,326 B2
Marwah et al. (45) Date of Patent: Jun. 2, 2026

(54) IN-CONTEXT LEARNING IN LARGE LANGUAGE MODELS FOR COMPUTING DATA

(71) Applicant: MICRO FOCUS LLC, Santa Clara, CA (US)

(72) Inventors: Manish Marwah, Pleasanton, CA (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 223 days.

(21) Appl. No.: 18/343,657

(22) Filed: Jun. 28, 2023

(65) Prior Publication Data

US 2025/0007790 A1 Jan. 2, 2025

(51) Int. Cl.
H04L 41/16 (2022.01)
H04L 9/40 (2022.01)
H04L 43/04 (2022.01)

(52) U.S. Cl.
CPC .............. H04L 41/16 (2013.01); H04L 43/04 (2013.01); H04L 63/1408 (2013.01)

(58) Field of Classification Search
CPC ......... G06F 40/30; H04L 41/16; H04L 43/04; H04L 43/045; H04L 43/14; H04L 63/1408

See application file for complete search history.

(56) References Cited

U.S. PATENT DOCUMENTS

| | | | | |
|---|---|---|---|---|
| 12,210,973 B2 * | 1/2025 | Johnson | .................. | G06F 40/30 |
| 12,488,194 B2 * | 12/2025 | Araki | ..................... | G06F 40/30 |

| | | | | |
|---|---|---|---|---|
| 2024/0070270 A1 * | 2/2024 | Mace | .................... | G06F 21/554 |
| 2024/0137375 A1 * | 4/2024 | Srivatsa | ................ | H04L 41/142 |
| 2024/0289558 A1 * | 8/2024 | Muraoka | ................ | G06F 40/30 |
| 2024/0291853 A1 * | 8/2024 | Murphy | ................. | H04L 41/16 |
| 2024/0330446 A1 * | 10/2024 | Bulut | ................... | G06N 3/0895 |
| 2024/0427879 A1 * | 12/2024 | Bulut | ................... | G06F 21/554 |
| 2024/0428937 A1 * | 12/2024 | Natarajan | ............. | G16H 50/20 |

OTHER PUBLICATIONS

Alec Radford, et al., "Improving language understanding by generative pre-training", 2018, 12 pages.
Alec Radford, et al., "Language models are unsupervised multitask learners", 2019, 24 pages.
Sang M. Xie, et al., "How does in-context leaning work? A framework for understanding the differences from traditional supervised learning", Aug. 1, 2022, 12 pages.

(Continued)

*Primary Examiner* — Patrice L Winder

(74) *Attorney, Agent, or Firm* — Sheridan Ross P.C.

(57) ABSTRACT

According to examples, an apparatus may include a processor and a non-transitory computer-readable medium on which is stored machine readable instructions that may cause the processor to receive a prompt for a large language model (LLM). The received prompt may include a query to perform a task on computing data through in-context learning in the LLM. The LLM may be fine-tuned on the computing data. In response to the received prompt, the processor may cause the LLM to learn the task via the in-context learning in the LLM. The processor may cause the LLM to output a completion in response to the query for the task. The completion may be generated by performing the learned task on the computing data in the LLM.

20 Claims, 8 Drawing Sheets

(56) References Cited

OTHER PUBLICATIONS

Tom B. Brown, et al., "Language models are few-shot learners", 2020, 75 pages.

Wikipedia, "GPT-2", 12 pages, downloaded Jun. 28, 2023. https://en.wikipedia.org/wiki/GPT-2.

Wikipedia, "NetFlow", 13 pages, download date Jun. 28, 2023. https://en.wikipedia.org/w/index.php?title=NetFlow&oldid=1153303931.

* cited by examiner

APPARATUS
100

MEMORY
110

RECEIVE A PROMPT INCLUDING
A QUERY TO PERFORM A TASK
BASED ON IN-CONTEXT
LEARNING IN A LARGE
LANGUAGE MODEL (LLM)
112

CAUSE THE LLM TO LEARN
THE TASK VIA IN-CONTEXT
LEARNING
114

CAUSE THE LLM TO OUTPUT A
COMPLETION IN RESPONSE TO
THE QUERY, THE COMPLETION
BEING GENERATED BY
PERFORMING THE LEARNED
TASK IN THE LLM
116

PROCESSOR
102

SYSTEM
200

NETWORK
202

SERVER
204

DATA
STORE
205

APPARATUS
100

PROCESSOR
102

MEMORY
110

COMPUTING DATA
214

GENERATED TOKENS
218

LARGE LANGUAGE MODEL (LLM)
208

PRE-TRAINED LLM
224

PRE-TRAINED
VOCABULARY
222

FINE-TUNED LLM
226

UPDATED
VOCABULARY
220

PROMPT
206

QUERY
210

COMPLETION
212

RESPONSE
216

LARGE LANGUAGE MODEL (LLM) TRAINING PROCESS
FOR COMPUTING DATA (NETWORK TRAFFIC DATA)
300

FEW-SHOT LEARNING PROMPT
400

COMPUTING DATA TOKENIZATION
500

NON-DATA-AWARE TOKENIZATION

DATA-AWARE TOKENIZATION

LARGE LANGUAGE MODEL (LLM) ARCHITECTURE
600

METHOD
700

RECEIVE
HETEROGENEOUS DATA
702

TOKENIZE THE RECEIVED
HETEROGENEOUS DATA
BASED ON TYPES OF DATA
704

FINE-TUNE A LARGE
LANGUAGE MODEL (LLM)
USING THE TOKENIZED
HETEROGENEOUS DATA
706

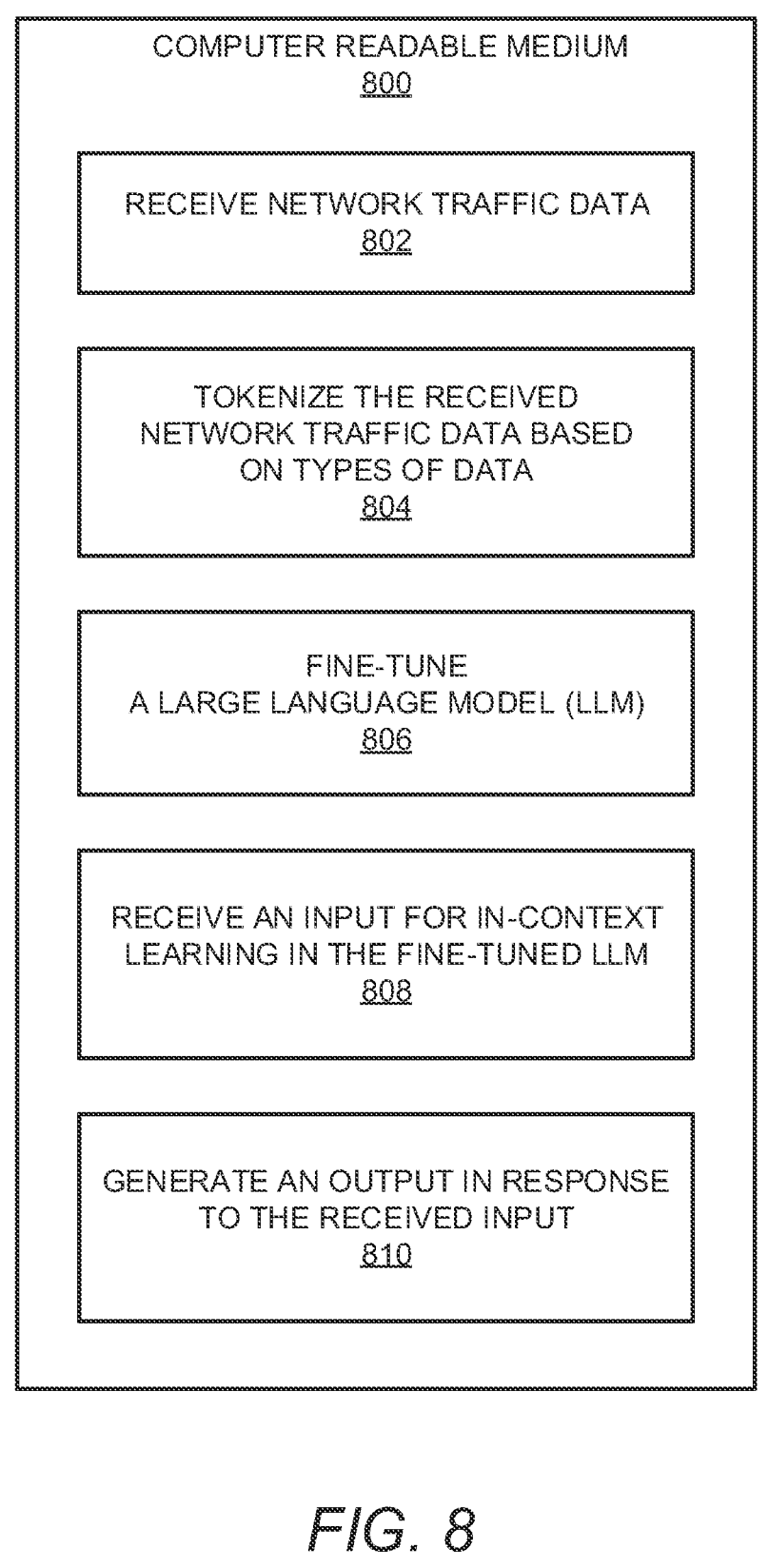

COMPUTER READABLE MEDIUM
800

RECEIVE NETWORK TRAFFIC DATA
802

TOKENIZE THE RECEIVED
NETWORK TRAFFIC DATA BASED
ON TYPES OF DATA
804

FINE-TUNE
A LARGE LANGUAGE MODEL (LLM)
806

RECEIVE AN INPUT FOR IN-CONTEXT
LEARNING IN THE FINE-TUNED LLM
808

GENERATE AN OUTPUT IN RESPONSE
TO THE RECEIVED INPUT
810

*FIG. 8*

IN-CONTEXT LEARNING IN LARGE LANGUAGE MODELS FOR COMPUTING DATA

BACKGROUND

Computing data, such as network traffic data, may be analyzed to detect conditions and events related to a computing device or a network on which the computing device is operating. In some examples, machine learning models may be used to facilitate analysis of the computing data.

BRIEF DESCRIPTION OF DRAWINGS

Features of the present disclosure are illustrated by way of example and not limited in the following figure(s), in which like numerals indicate like elements, in which:

FIG. 8 depicts a block diagram of an example computer-readable medium that has stored thereon machine readable instructions that when executed by a processor, may cause the processor to fine-tune a pre-trained LLM based on network traffic data, and process tasks via few-shot learning inputs through in-context learning in the fine-tuned LLM.

DETAILED DESCRIPTION

Figure 1:
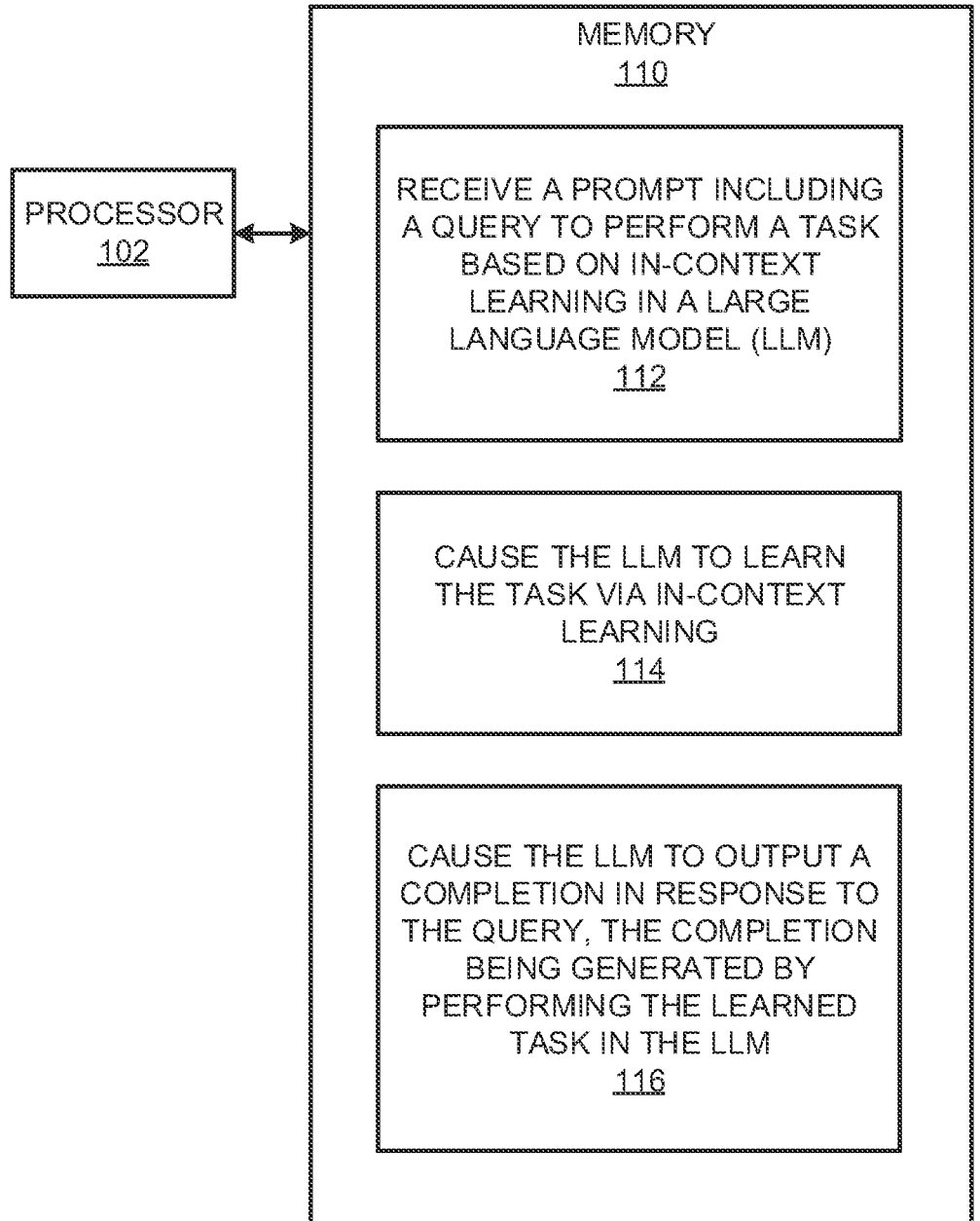
FIG. 1 depicts a block diagram of an example apparatus that may receive prompts for large language models (LLMs), cause the LLMs to learn tasks via in-context learning in response to the received prompts, and cause the LLMs to output completions in response to the prompts.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Computing devices may generate various types of computing data during operation. Computing data as defined herein may be data produced by computing devices. The computing data may be collected and stored, for instance in data logs, tables, and/or the like. Various types of data related to the computing devices and the environment on which the computing devices are operating may be captured, such as network traffic data, network security data, application data, or other types of data. In some examples, raw network packets including packet headers and payload may be captured. The captured data may be stored in data logs, such as network traffic logs, firewall or intrusion detection system logs, application logs, and/or the like. In some examples, the computing data may be stored in network data logs such as NetFlow™ logs, and the like. For instance, network data logs, such as NetFlow™ logs, may be used to store metadata about IP traffic flows traversing a network device, such as a router, a host, and/or the like. In some examples, the network data logs may store network traffic statistics according to a predefined structure, including the types of parameters captured, the format of the data, and the like. For instance, a network data log may store a network flow record having predefined values, such as the flow start date, flow duration, protocol, source and destination IP addresses and ports, number of packets, number of bytes, number of flows, and the like.

The captured data may be analyzed to derive insights into the operation of the computing devices and the network on which they are operating. For purposes of illustration and ease of description, various examples described in the present disclosure are described with respect to a particular type of computing data, namely network traffic data. However, it should be appreciated that other types of computing data that may be collected and stored, such as network security data logs, application data logs, raw network packets, and/or the like, may also be applicable to the present disclosure.

By way of particular example, network traffic data may be useful in providing insights into the operation of a network because it contains information about the network, such as patterns indicative of intrusions, malware, network behaviors, device health, and/or the like. In some examples, an analyst at a security operations center (SOC) may analyze the network traffic data to identify various types of events, such as security threats. However, in many instances, the amount and complexity of the captured data may make it difficult to timely and accurately analyze the network traffic data, particularly due to the volume and velocity in which the data is generated.

In some instances, due to the relatively high complexity and volume of network traffic data, automated tools based on machine learning are used to analyze the data. Machine learning models may be built to perform tasks on network traffic data by training them on the network traffic data. However, in many of these instances, the machine learning models are based on supervised learning (SL) and are built for a specific task from a relatively large amount of labeled data.

Supervised learning is a machine learning paradigm for tasks in which the available data consists of labeled examples. The machine learning models are trained for a particular task using these labeled examples, which are based on data collected and features extracted for the particular task. If new tasks are desired by the analyst, new machine learning models may need to be constructed for each of the new tasks. However, creating new machine learning models for each new task may be complex and time consuming, particularly since each new machine learning model may require a large amount of labeled data for effective training.

Large language models (LLM) are a type of machine learning model that have the capability to perform a wide range of tasks as opposed to one specific task, such as classification, data generation, feature extraction, sentiment analysis, named entity recognition, mathematical reasoning, and/or the like. In this regard, LLMs may be referred to as "multi-task learners." As such, the use of LLMs to analyze network traffic data may alleviate the need to build a new model each time a new task is needed.

Additionally, LLMs may address the need to generate large amounts of labeled data for learning new tasks. LLMs are deep learning models that may be used for a variety of tasks. LLMs are language models that include a neural network with many parameters, with weights in the billions or more, and trained on relatively large quantities of unlabeled text using self-supervised learning (SSL) or semi-supervised learning. Self-supervised learning is a machine learning paradigm for processing unlabeled data, which may be data that does not require human annotated labels, to obtain useful representations that can help with downstream learning tasks. Semi-supervised learning is a machine learning paradigm that combines a relatively small amount of labeled data with a relatively large amount of unlabeled data during training. Self-supervised learning and semi-supervised learning may be helpful in instances where a large amount of labeled data is not available.

LLMs are a type of a language model. Language models may be used in natural language processing (NLP) applications, in which a user inputs a query in natural language to generate a result. LLMs may dramatically expand the amount of data used for training and inference in the language models, relative to language models.

Generally, language models are probabilistic models of a language. For instance, language models may estimate the probability of a sentence, such as the probability P("It is raining") or equivalently P("it", "is", "raining"). This joint probability of words occurring together may more conveniently be expressed as a product of conditional probabilities using the chain rule as depicted in the following equation:

$$P(w_1, w_2, w_3, \ldots, w_n) = \sum_{i=1}^{n} P(w_i \mid w_{i-1}, w_{i-2}, \ldots w_1) = \sum_{i=1}^{n} P(w_i \mid w_{j<i})$$

Where P is the probability and $w_1$ to $w_n$ are the words in the sentence. Conditional probability may be defined as the likelihood of an event or outcome occurring, based on the occurrence of a previous event or outcome.

Directly estimating these high-dimensional conditional probabilities requires a relatively large amount of data and hence, some instances, parametrized models may be used. However, relatively simple models, such as n-gram models, may still contain an exponential number of parameters, which require very large amounts of data to learn, or alternatively, the model quality and accuracy may drop if assumptions are made to reduce the number of parameters. Using a neural network model to predict these conditional probabilities, $P(w_i \mid w_{j<i})$, may significantly decrease the number of model parameters required relative to simpler methods, while retaining higher accuracies. However, the use of neural network models may come at the cost of increased computation and hence an increased need for computing resources.

The natural language input to language models, such as a sequence of words, may be referred to as a "context." Given the context, a language model may perform a task, such as sentiment analysis, classification, and/or the like. The context may also be referred to as a "prompt," and the result produced may be referred to as a "completion." The capability and accuracy of language models may increase relative to the number of parameters, quantity of training data, and computation used for training. As such, the language models are commonly trained on very large amounts of text corpora, for instance from the Internet, books, magazines, and/or the like, and may use a large transformer-based architecture, which may have hundreds of billions or trillions of model parameters. As such, a relatively large amount of processing resources may be required to train the language models, particularly as the size of the language models are scaled up. Such language models may be referred to as LLMs.

LLMs may have emergent properties, which are an unpredictable phenomenon of LLMs. Emergent properties are a phenomenon that occurs in relatively large models, in which the LLMs are found to have properties for which the LLMs were not originally trained. Properties of LLMs may be considered emergent when they are not present in smaller models but are present in larger models. For instance, it may not be possible to predict emergent abilities in LLMs by extrapolating a performance of smaller models. One such emergent property of LLMs is in-context learning.

In-context learning may be referred to as a prompting technique that allows the LLMs to process examples related to a particular task before attempting the task. Prompts for in-context learning may be contextual, natural language text relevant to particular tasks. In some examples, an in-context learning prompt may list training examples made up of problem/solution pairs, which are concatenated together with a task query. The task query may be the input instructions for the task to be learned. Each of the listed training examples in the in-context learning prompt may be conditioned on the same prompt concept describing the task to be learned. The LLMs may process the training examples given in the in-context learning prompt to learn a task, and predict an appropriate response to the task query based on the learned task.

LLMs, especially at large scales, may be "few-shot learners," which require relatively few training examples to learn a task. Few-shot learning, or few-shot prompting, is a technique that is similar to in-context learning, but in which a relatively few examples of the problem/solution pairs, or "shots," are provided for the LLMs to process before attempting the task. The accuracy of few-shot learning may increase as the sizes of the LLMs are scaled up.

However, in many instances, LLMs may not be suitable in processing queries based on heterogeneous data, in contrast to homogeneous data. Homogeneous data may be made up of the same type of data, such as natural language that is made up of words. In contrast, heterogeneous data as defined herein may be data that includes multiple types of data, such as internet protocol (IP) addresses, port numbers, flags, device addresses, and/or the like. In some examples, heterogeneous data may include text in natural language in combination with another type of data. For instance, a data log may be made up of characters arranged in predefined sequences or formats based on the type of data, such as a device address that may have a specific combination of letters, numbers, and/or symbols.

In many instances, LLMs are based on homogeneous data, particularly of words, and general text tokenizers are used to perform uniform tokenization over the entire text corpus. In these instances, when text tokenizers encounter an unknown word, such as heterogeneous data, the text tokenizers may treat each digit or letter as a separate token. As such, the text tokenizer may generate a relatively large number of tokens, which in turn may effectively reduce the context size of the LLMs and hence the amount of instructions that can be included in the query. For instance, LLMs have a context window of predefined lengths, which may be measured in number of tokens. The input to a model must be less than the context window length. By way of particular example, if the text tokenizer breaks up an IP address "10.13.46.79" into individual characters, the text tokenizer would generate 11 tokens, one for each digit and dot for this single IP address. As such, the effective size of the context, and thus the amount of instructions that can be included in a query, may be significantly decreased. Additionally, in this example, the tokens generated by the text tokenizer may be less meaningful as they would not have semantic meaning, for instance, that the digits are part of an IP address. For these reasons, LLMs may generally be ineffective for tasks on heterogeneous data, such as computing data.

Disclosed herein are apparatuses and methods for training an LLM to perform a task on computing data through in-context learning. A processor may receive a prompt for the LLM that includes a query to perform the task on the computing data. In response to the received prompt, the processor may cause the LLM to learn the task via the in-context learning and output a completion in response to the query based on the learned task.

The processor may fine-tune the LLM on the computing data to enable in-context learning for tasks on the computing data. In order to use the computing data for fine-tuning, the processor may tokenize the computing data. In some examples, the processor may tokenize the computing data based on types of data included in the computing data such that the generated tokens have semantic meaning correlated to the types of data. In some examples, the processor may add the generated tokens to a natural language vocabulary of the LLM during fine-tuning, which may increase the size of the vocabulary of the LLM.

A technical problem associated with automated machine learning tools for analyzing computing data may be that the machine learning models may be built to perform a single, specific task and a new machine learning model may need to be built for each new task. In these instances, relatively large amounts of human effort and processing resources may be needed to generate labeled training data for the new tasks, as well as to train the new models on the relatively large amount of generated training data.

In some instances, LLMs may be used to address the single task issue by leveraging the multi-task learning capability of LLMs. However, LLMs may have inadequate performance when used for heterogeneous data, such as computing data, because LLMs may be optimized for natural language. For instance, LLMs may use general text tokenization optimized for natural language that does not recognize computing data. For instance, when general text tokenizers encounter computing data, it may treat the computing data as unknown words. In some examples, the general text tokenizers may employ character-based tokenization that breaks up the unknown text and treats each individual character as a separate token. As a result, a relatively large number of tokens are generated for the computing data, which in turn reduces the effective context size, resulting in less effective inputs to the LLMs. In these instances, the tokens, which correlate to individual characters, may also be less meaningful because semantic meaning to the computing data may be lost.

Through implementation of the apparatuses and methods disclosed herein, a processor may enable the use of LLMs to learn tasks via in-context learning for heterogeneous data, such as computing data. The use of LLMs may leverage the multi-task learning capability of LLMs to address the need to build new machine learning models for each new task, which in turn may reduce the amount of computing resources consumed in training for multiple tasks. By enabling the use of LLMs for computing data, the processor may enable relatively faster task learning via in-context learning, which in turn may reduce the amount of computing resources consumed for training. By enabling the use of LLMs, the processor may eliminate or reduce the requirement for labeled training data and hence the amount of human effort and processing resources required to generate the labeled training data, which in turn may reduce the amount of processing resources consumed for training. The processor may tokenize the heterogeneous data through data-aware tokenization to generate tokens having semantic meaning, which may enable improved accuracy and performance of the LLMs. The processor may fine-tune the LLMs based on these tokens, which are added to the vocabulary, which may effectively increase the context size of the LLMs, enabling larger and more diverse queries. These improvements in accuracy and performance of the LLMs for heterogeneous data may reduce the amount of time needed to complete a certain task and thus reduce the amount of computing resources consumed.

Figure 2:
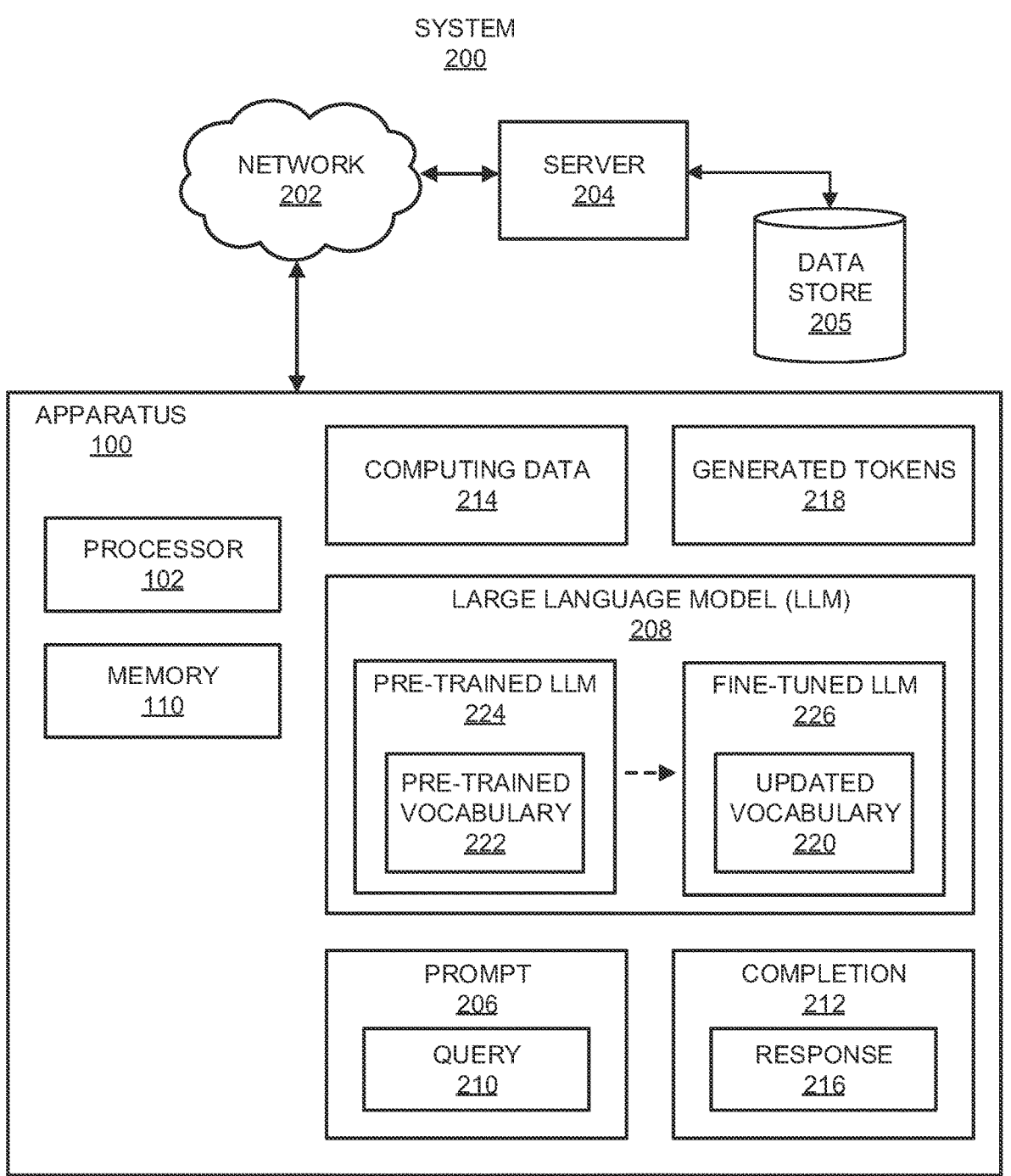
FIG. 2 depicts a block diagram of an example system in which the apparatus depicted in FIG. 1 may be implemented to fine-tune pre-trained LLMs on computing data, and to process prompts for tasks on the computing data via in-context learning in the fine-tuned LLMs.
Figure 3:
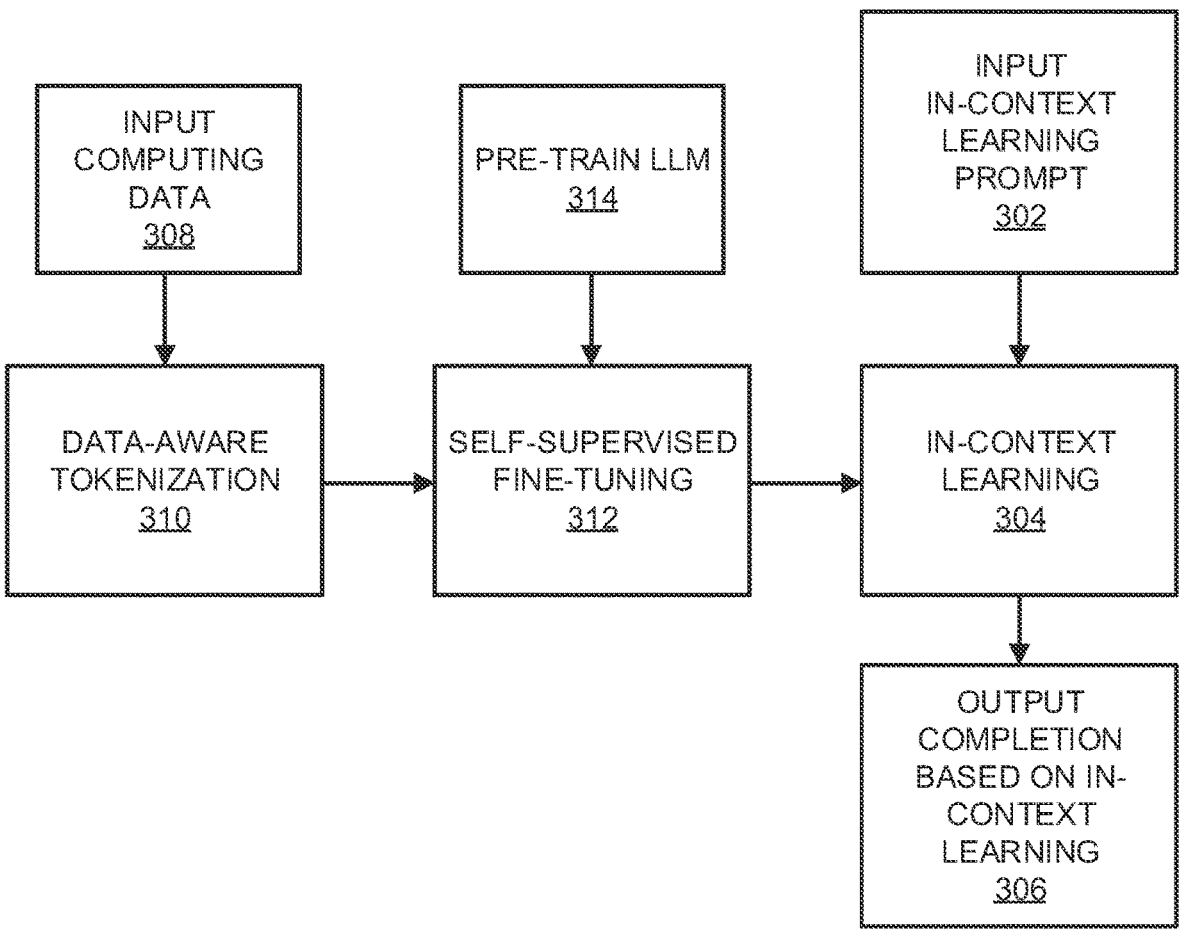
FIG. 3 depicts a flow diagram of an example process for training LLMs on computing data, including data-aware tokenization for tokenizing the computing data, fine-tuning the LLMs based on the tokenized computing data, and in-context learning in the LLMs via prompts.
Figure 4:
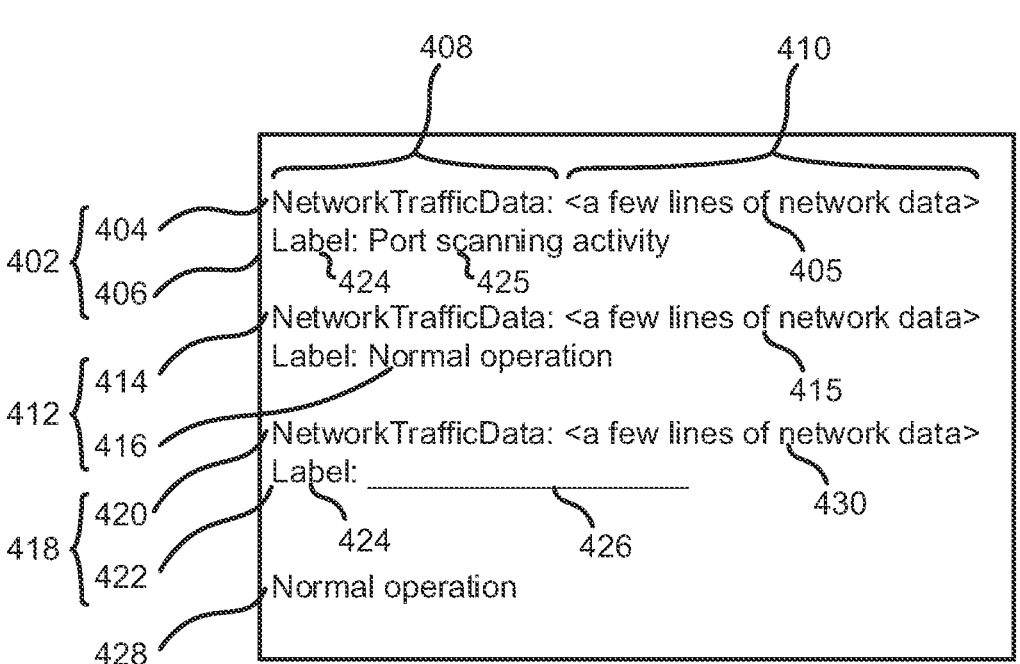
FIG. 4 depicts a diagram of an example few-shot learning prompt for LLMs to generate an output via in-context learning.
Figure 5:
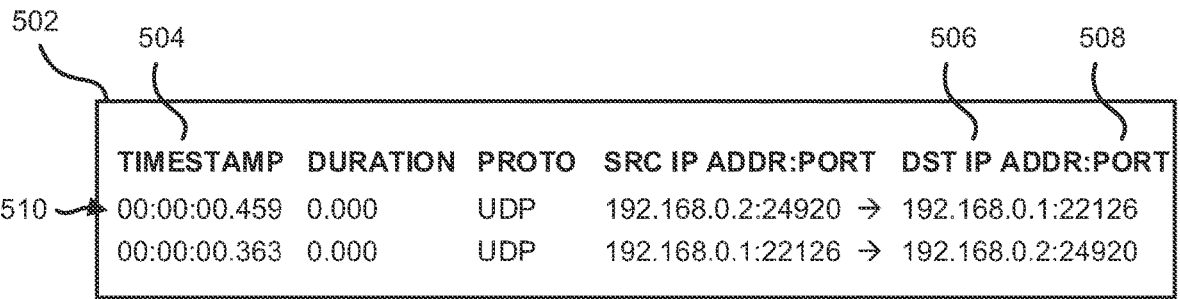
FIG. 5 depicts diagrams illustrating example computing data tokenization, including an example network traffic data, an example text tokenizer to generate tokens for the network traffic data based on non-data-aware tokenization, and an example data-aware tokenizer to generate tokens for the network traffic data based on data-aware tokenization.
Figure 5:
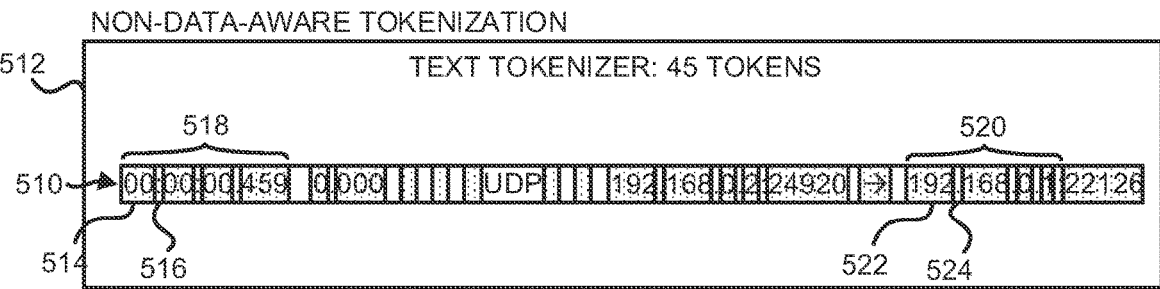
Figure 5:
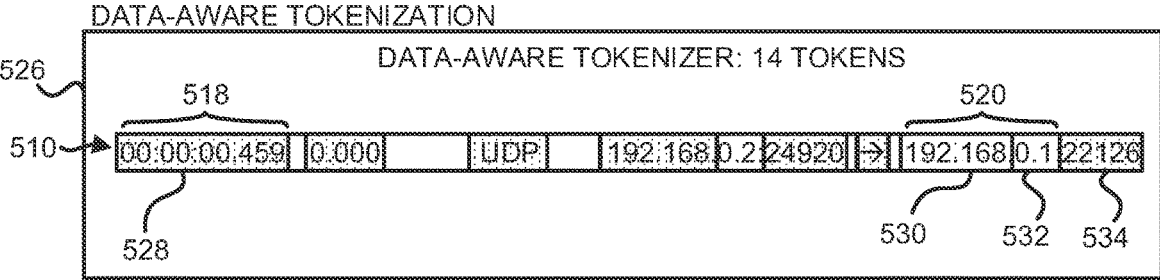
Figure 6:
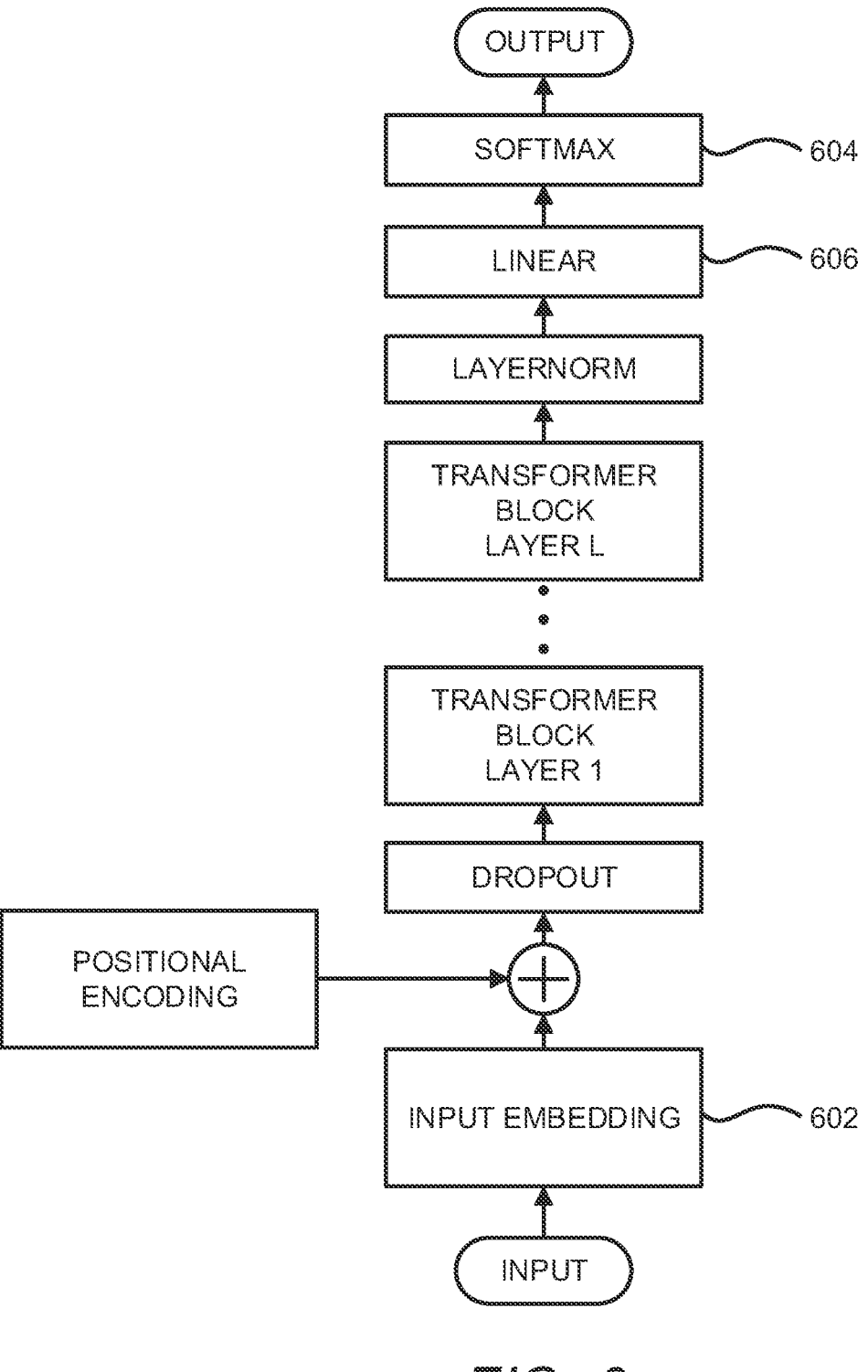
FIG. 6 depicts a flow diagram of an example LLM architecture.

Reference is first made to FIGS. 1-6. FIG. 1 depicts a block diagram of an example apparatus 100 that may receive prompts 206 for large language models (LLMs) 208 as depicted in FIG. 2, cause the LLMs 208 to learn tasks via in-context learning in response to the received prompts 206, and cause the LLMs 208 to output completions 212 in response to the prompts 206. FIG. 2 depicts a block diagram of an example system 200 in which the apparatus 100 depicted in FIG. 1 may be implemented to fine-tune pre-trained LLMs 224 on computing data 214, and to process prompts 206 for tasks on the computing data 214 via in-context learning in the fine-tuned LLMs 226. FIG. 3 depicts a flow diagram of an example process 300 for training LLMs on computing data, including data-aware tokenization for tokenizing the computing data 214, fine-tuning the LLMs 208 based on the tokenized computing data, and in-context learning in the LLMs via prompts. FIG. 4 depicts a diagram of an example few-shot learning prompt 400 for LLMs 208 to generate an output via in-context learning. FIG. 5 depicts diagrams illustrating example computing data tokenization 500, including an example network traffic data 502, an example text tokenizer 512 to generate tokens for the network traffic data 502 based on non-data-aware tokenization, and an example data-aware tokenizer 526 to generate tokens 218 for the network traffic data 502 based on data-aware tokenization. Finally, FIG. 6 depicts a flow diagram of an example an LLM architecture 600.

It should be understood that the apparatus 100 depicted in FIG. 1, the system 200 depicted in FIG. 2, the example LLM training process 300 depicted in FIG. 3, the example few-shot learning prompt 400 depicted in FIG. 4, the example computing data tokenization 500 depicted in FIG. 5, and/or the example LLM architecture 600 depicted in FIG. 6 may include additional features and that some of the features described herein may be removed and/or modified without departing from the scope of the apparatus 100, the system 200, the LLM training process 300, the few-shot learning prompt 400, the computing data tokenization 500, and/or the LLM architecture 600.

The apparatus 100 may be a server, a node in a network (such as a data center), a personal computer, a laptop computer, a tablet computer, a smartphone, a network gateway, a network router, an Internet of Things (IoT) device, and/or the like. As depicted in FIG. 2, the apparatus 100 may be part of a network environment in which the apparatus 100 may communicate with other devices, such as the server 204, via a network 202. The network 202 may be a local area network, a direct connection, a wide area network, the Internet, or the like. In instances in which the network 202 is a local area network, the network 202 may be a wireless fidelity network, a Bluetooth™ connection, or the like.

As depicted in FIGS. 1 and 2, the apparatus 100 may include a processor 102 and a memory 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and multiple memories 110.

The memory 110 may be, for example, a Random Access memory (RAM), an Electrically Erasable Programmable Read-Only Memory (EEPROM), a storage device, an optical disc, or the like. The memory 110, which may also be referred to as a computer-readable storage medium or a machine-readable storage medium, may be a non-transitory computer-readable storage medium, where the term "non-transitory" does not encompass transitory propagating signals. In any regard, the memory 110 may have stored thereon machine-readable instructions 112-116.

The processor 102 may fetch, decode, and execute the instructions 112 to receive a prompt 206 for an LLM 208, which may cause the LLM 208 to learn new tasks. As depicted in block 302 of FIG. 3, the received prompt 206 may be an in-context learning prompt. The prompt 206 may include a query 210 to perform a task on heterogeneous data through in-context learning in the LLM 208, in which the LLM 208 is fine-tuned to process tasks on the heterogeneous data. In some examples, the heterogeneous data may be computing data 214 depicted in FIG. 2.

The prompt 206 may be one of various types of in-context learning prompts, including a few-shot learning prompt, a one-shot learning prompt, a zero-shot learning prompt, a chain-of-thought learning prompt, and/or the like. In-context learning prompts may include training examples concatenated together with an input query, based on which the LLM 208 may generate an output. The training examples may be referred to as "shots." A few-shot learning prompt may include a relatively small number of training examples, or "shots." A one-shot learning prompt may include one training example and a zero-shot learning prompt may include zero number of examples. A chain-of-thought learning prompt may include a training example, as in the few-shot learning prompt, but rather than provide a response to a question as in the few-shot learning prompt, the chainof-thought learning prompt may include a chain of thought, or a sequence of intermediate steps as an explanation of how to arrive at the response before stating the response in an example question. Chain-of-thought prompting may prompt the LLM 208 to decompose multi-step problems to produce intermediate reasoning steps before outputting the final response, which may improve the reasoning ability of the LLM 208.

By way of particular example and for purposes of illustration, the prompt 206 may be a few-shot learning prompt 400, as depicted in FIG. 4. In this particular example, the few-shot learning prompt 400 is an in-context learning input for a task on network traffic data 502, specifically a classification task on network traffic. Various examples in the present disclosure, including this particular example, are described as examples in which the computing data 214 is network traffic data, such as the network traffic data 502 depicted in FIG. 5. It should be appreciated, however, that the present description is not limited to a particular type of computing data, such as the network traffic data 502, and may equally be applicable to other types of heterogeneous data associated with a computing device, such as network security data, network traffic data, firewall and/or intrusion detection system data, application data, device health data, raw network packets, and/or the like.

The query 210 may include a task query, which may be instructions for the LLM 208 to perform a particular task on the computing data 214 via in-context learning. The LLM 208 may generate a response 216 in response to the query 210 by performing the task on the computing data 214. In some examples, the task query may be listed in the prompt 206 without a correlated value for the response 216, such as a blank space, which act as an instruction to the LLM 208 to generate a value in response to the task query to fill-in the blank space. In some examples, the query 210 may include a predefined number of training examples listed together with the task query. The training examples may be in the form of query/response pairs, also referred to as problem/solution pairs or input/output pairs. The training examples and the task query may share the same task concept. The processor 102 may cause the LLM 208 to learn the common task based on the training examples and predict an output correlated with the task query by applying the learned task per the task query.

Continuing with the particular example in which the prompt 206 is the few-shot learning prompt 400 depicted in FIG. 4, the few-shot learning prompt 400 may include a first training query/response pair 402 as a training example. The first training query/response pair 402 may include a first training query 404 and a first training response 406 correlated to the first training query 404. The first training query/response pair 402 may include a combination of text in natural language and text in a computing data format. For instance, a first portion of the first training query/response pair 402 may include a tag 408. The tag 408 may be in a natural language format and may include a description, for instance, the text "Network Traffic Data" as depicted in FIG. 4 or the like. A second portion of the first training query/response pair 402 may include sample data 410, such as text in network traffic data format. For instance, the sample data 410 may include a few lines of the network traffic data 502 from a received data log.

The lines of network traffic data 502 may include text in a predefined format in which the network traffic data 502 is formatted. The network traffic data 502, which is heterogeneous data, may include multiple data types such as network flow records that includes network parameters. In some examples, the network traffic data 502 may include natural language text combined with the network parameters. For instance, the network traffic data 502 may have a predefined format in which different types of data may be arranged in an ordered sequence, such as timestamps, protocol identification, source/destination IP addresses, host addresses, and/or the like. Additionally, each of the different types of data may have corresponding formats. In some examples, the network traffic data 502 may have a predefined format in which the data may or may not have consistent ordering. For instance, the network traffic data 502 may include (key, value) pairs, which may or may not have consistent ordering, such that in one entry key1 and its associated value may appear before key2 and its associated value, and in a second entry key2 and its associated value may appear before key1 and its associated value. In some instances, a key may appear without an associated value for that entry.

The few-shot learning prompt 400 may include a relatively small number of training query/response pairs for the LLM 208 to learn the task. The number of training examples to be included in the prompt 206 may be based on the performance of the LLM 208, the size of the LLM 208, the training data, the available processing resources, and/or the like, and may be user-defined, based on historical data, experimentation, modeling, and/or the like. For instance, the few-shot learning prompt 400 may include as little as a single training example related to the task, up to a predefined number of training examples. Continuing with the particular example, the first training query/response pair 402 in the few-shot learning prompt 400 may include a first training response 406 correlated to the first training query 404. The first training response 406 may include the words "Label: Port scanning activity". The word "Label" may be a tag for the task, such as the tag 424, and the text "Port scanning activity" may be the expected value 425 for the "Label" tag 424 correlated to the lines of network traffic data 405 in the first training query 404. It should be appreciated that while a "Label" tag is used for the tag 424 in this particular example, various types of tags 424 may be used in the few-shot learning prompt 400. For instance, the tag 424 may be "Answer", "Anomaly Type", "Class Type", or another appropriate type of tag.

In some examples, the few-shot learning prompt 400 may include a second training query/response pair 412 that includes a second training query 414 and a second training response 416 correlated to the second training query 414. The second training query 414 may have the same structure as the first training query 404, but may include different example lines of the network traffic data 415 than the first training query 404. In this particular example, the lines of data in the second training query 414 may correlate to normal operation, and in this instance, the second training response 416 may include the expected response to the input lines of data, namely the words "Normal operation".

The few-shot learning prompt 400 may include a task query/response pair 418, which may form the instructions for performing the task. The task query/response pair 418 may be referred to herein as a test input or a task query. The task query/response pair 418 may include a task query 420 including lines of the network traffic data 430 for which the LLM 208 is to perform the task. The task query/response pair 418 may include a blank response 422 correlated to the task query 420. For instance, the blank response 422 may include the "Label" tag 424, which may be the same as the "Label" tags in the training examples, but a value for the tag 424 may be left blank, for instance by a blank space 426 depicted in FIG. 4. The training examples and the task query may share a common task concept, namely a network classification task in this particular example.

The processor 102 may fetch, decode, and execute the instructions 114 to cause the LLM 208 to learn the task via the in-context learning in the LLM 208. In block 304, the processor 102 may cause the LLM 208 to process a new task that is described in the prompt 206. Continuing with the particular example in which the few-shot learning prompt 400 is for a classification task on the network traffic data 502, the processor 102 may cause the LLM 208 to learn the task based on the training examples included the few-shot learning prompt 400, for instance, based on examples of the task as set forth in the training query/response pairs 402 and 412. In some examples, the processor 102 may cause the LLM 208 to process the listed training examples prior to processing the task. The LLM 228 may learn the task based on the training examples through few-shot learning via in-context learning, for instance, by conditioning on the training examples, without optimizing parameters of the LLM 208.

In block 306, the processor 102 may cause the LLM 208 to output a completion 212 in response to the prompt 206 based on the learned task. The processor 102 may fetch, decode, and execute the instructions 116 to cause the LLM 208 to output the completion 212 in response to the query 210 for the task. The processor 102 may generate the response 216 by performing the learned task on the computing data 214 in the LLM 208. Continuing with the particular example in which the few-shot learning prompt 400 is for the classification task on network traffic data 502, the processor 102 may cause the LLM 208 to perform the classification task by conditioning the classification task on the listed training examples, and generate a value for the output response 428. The processor 102 may cause the LLM 208 to output the completion 212 to include the generated output response 428 correlated to the task query 420. For instance, the LLM 208 may generate the output response 428 by predicting the tokens, or words, that should appear after the "Label" tag 424, based on the lines of network traffic data 430 included in the task query 420 and the listed training examples. In this particular example, the processor 102 may cause the LLM 208 to output the completion 212 to include the output response 428 with the words "Normal operation" as the determined network condition classification correlated to the lines of network traffic data 430, as depicted in FIG. 4.

In some examples, the processor 102 may pre-train the LLM 208 on the computing data 214, which may improve the performance of the LLM 208 for tasks on the computing data 214. In this regard, in order to use the computing data 214 for fine-tuning the LLM 208, the processor 102 may access and pre-process the data for use in the LLM 208.

In block 308, the processor 102 may receive the computing data 214 to be used for fine-tuning the LLM 208. The processor 102 may access the computing data 214 from the server 204, a data store 205 connected to server 204 or another device on the network 202, the memory 110, and/or the like. The computing data 214 may be in the form of a data log, which may include data related to network traffic, firewall or intrusion detection systems, application data, and/or the like. The computing data 214 may be heterogeneous data that includes different types of data, each of which may have different formats. Continuing with the particular example of the few-shot learning prompt 400 for a classification task on network traffic data 502, the network traffic data 502 may be received in the form of a network traffic data log. In some examples, the network traffic data logs may be NetFlow™ logs, or the like. The network traffic data log may contain data for each flow on the network 202, including attributes for each flow such as timestamps, duration, protocol, source IP addresses, source port numbers, destination IP addresses, destination port numbers, number of packets, number of bytes, the number of flows, and/or the like. Each of the attributes may be considered to be a different type of data, which may have different formats and comprised of different types of characters. For instance, a certain attribute, such as IP addresses, may be considered to be a particular type of network traffic data, which may have a predefined combination of letters, numbers, symbols, and the like. For instance, an Internet Protocol version 4 (IPv4) IP address may have a predefined format expressed in a dot-notation format having a concatenated series of numbers, separated by dots or periods, and an Internet Protocol version 6 (IPv6) IP address may have a predefined format that includes eight 16-bit fields separated by colons. The computing data 214 may be made up of text formatted for such types of data.

In block 310, the processor 102 may tokenize the computing data 214 for input to the LLM 208. As previously discussed, in order to use data in a machine language model, the data must first be pre-processed so that the machine language model can use the data. Tokenization is a part of the pre-processing of the data for the LLM 208. The data in network traffic data logs, such as the network traffic data 502, may be comprised of text. The processor 102 may tokenize the text by converting sequences of the text into the generated tokens 218. The generated tokens 218 may be considered to be words, and may form the vocabulary 220 of the LLM 208.

Generally, LLMs may use text tokenizers, such as a text tokenizer 512 depicted in FIG. 5, to tokenize the training text corpus. In some examples, the text tokenizer 512 may be used to tokenize heterogeneous data, such as the computing data 214. The text tokenizer 512 may employ various text based tokenization schemes to tokenize the text. In some examples, the text tokenizer 512 may use a byte-based tokenization scheme in which the text is tokenized by treating each byte as a token. For instance, in a case in which the text tokenizer 512 encounters an unknown word, or an out-of-vocabulary (OOV) word, which would frequently occur for heterogeneous data such the network traffic data 502, the text tokenizer 512 may tokenize the unknown word based on byte-based tokenization, by separating the OOV word into individual characters and tokenizing each character as a separate token. By way of particular example, in order to tokenize the destination IP address 520 "192.168.0.1" based on byte-based tokenization, the text tokenizer 512 may split the destination IP address 520 into individual digits and dots, and tokenize each digit and dot as a separate token. The byte-based tokenization scheme may ensure that the vocabulary size remains small or unchanged, since new words are not added to the pre-trained vocabulary 222. However, the number of tokens that may be needed for, for instance, a sentence may become relatively large and hence the effective context of the prompt 206 may be relatively short.

Another tokenization scheme is word-based tokenization scheme in which each word is considered to be a token. This scheme may reduce the number of new tokens generated than byte-based tokenization, and hence a relatively greater amount of text may fit in a certain context size. However, in the word-based tokenization scheme, the performance and accuracy of the LLMs may be degraded for OOV words, such as words that are unknown in the text corpus or for rare words. In these instances, the text tokenizer 512 may revert to the byte-based tokenization and treat each character of the unknown word as a separate token. Another tokenization scheme is sub-word tokenization. An example of sub-word tokenization is byte pair encoding (BPE). Sub-word tokenization may be a solution between word-based tokenization and byte-based tokenization, and attempts to address issues faced by word-based tokenization, such as relatively large vocabulary sizes, large numbers of tokens for OOV words, and different meaning of very similar words, as well as issues faced by byte-based tokenization, such as very long sentences and less semantic meaning for individual tokens. In implementing sub-word tokenization, the text tokenizer 512 may split rare words into smaller, meaningful sub-words, such as root words, while not splitting up frequently used words. This scheme may not result in a relatively large number of tokens 218 as the previous two schemes described above, and may work effectively for unknown or rare words that can be separated into sub-words. The text tokenizer 512 may employ any of the above described tokenization schemes. It should be appreciated that that the text tokenizer 512 may employ other types of text-based tokenization schemes for tokenizing natural language text corpora, which may have similar issues when tokenizing unknown words such as computing data 214.

Continuing with the particular example in which the computing data 214 includes the network traffic data 502 depicted in FIG. 5, the processor 102 may cause the text tokenizer 512 to tokenize the network traffic data 502. The network traffic data 502 may be comprised of text, which may include various fields correlated to different types of data. In some examples, the network traffic data 502 may have a timestamp field 504 for timestamp data, a destination IP address field 506 for destination IP addresses, a port field 508 for port numbers for the destination, among other fields as depicted in FIG. 5. For instance, the network traffic data 502 may include predefined types of data based on the formatting for the data log.

The processor 102 may cause the text tokenizer 512 to tokenize the first line 510 of text in the network traffic data 502. In this particular example, the text tokenizer 512 may tokenize the first line 510 based on sub-word tokenization described above, such as BPE. Sub-word tokenization may be relatively less effective on heterogeneous data such as the network traffic data 502. For instance, the text tokenizer 512 may identify a relatively large number of sub-words for heterogeneous text made up of a series of digits, symbols, letters, or the like. The text tokenizer 512 may tokenize the timestamp 518 "00:00:00.459" by separating the timestamp 518 into sub-words, such as the number "00", the symbol ":", and so forth, as depicted in FIG. 5. The text tokenizer 512 may generate a first token 514 for the number "00", a second token 516 for the symbol ":", and so forth. In this particular example, the text tokenizer 512 may generate 7 tokens for the timestamp 518. In this instance, each of the 7 tokens would be relatively less meaningful since these tokens would not be semantically correlated to the timestamp 518. In another example, for the destination IP address 520 correlated to the destination IP address field 506, the text tokenizer 512 may generate a first token 522 for the first number of the destination IP address 520, namely "192", a second token 524 for the dot ".", and so forth, generating 8 tokens for the destination IP address 520. In this example, the text tokenizer 512 may generate 45 tokens to represent the first line 510 of text from the network traffic data 502. In another example, the text tokenizer 512 may apply the byte-based tokenization to tokenize the first line 510 of the network traffic data 502. In applying byte-based tokenization, the text tokenizer 512 may tokenize each character as a separate token, also without consideration for the type of data. As such, a greater number of tokens would be generated for the first line 510 of the network traffic data 502 relative to the sub-word tokenization. In this case, the generated tokens may not have semantic meaning to the types of data in the network traffic data 502.

In some examples, the processor 102 may tokenize the computing data 214 based on data-aware tokenization. Data-aware tokenization may reduce the number of tokens generated for heterogeneous data, such as the computing data 214, as well as generate relatively more meaningful tokens by maintaining semantic meaning for each token, for instance, to the type of data.

Continuing with the particular example in which the computing data 214 is the network traffic data 502 depicted in FIG. 5, The processor 102 may cause the data-aware tokenizer 526 to tokenize the network traffic data 502. The data-aware tokenizer 526 may employ a tokenization scheme in which the tokenizer is aware of the data, such as the types of the data, the format of the data for each type of data, and/or the like. For instance, the data-aware tokenizer 526 may identify a sequence of text in the network traffic data 502 as being correlated to a type of network data, such as IP addresses. The data-aware tokenizer 526 may assign semantic meaning to the generated tokens 218 correlated to the identified sequence of text. In this particular example, the processor 102 may cause the data-aware tokenizer 526 to tokenize the first line 510 of the network traffic data 502. The data-aware tokenizer 526 may be aware of the types of data included in the network traffic data 502, and may tokenize the network traffic data 502 based on the identified types of data. In some examples, the data-aware tokenizer 526 may identify the types of data such as the timestamp 518 and the destination IP address 520 depicted in FIG. 5.

In some examples, the computing data 214 may be stored in a data log. The data log may have a predefined format and the data-aware tokenizer 526 may be aware of the predefined format of the data in the data log. For instance, a network traffic data log may contain data for a flow on the network 202, including predefined attributes for the flow such as timestamps, duration, protocol, source IP addresses, source port numbers, destination IP addresses, destination port numbers, number of packets, number of bytes, the number of flows, and/or the like. The data-aware tokenizer 526 may be aware of the predefined format of the data log as well as the semantic meaning of the various attributes.

In some examples, the data-aware tokenizer 526 may identify groups of data in the network traffic data 502 correlated to the types of data. The groups of data may include a sequence of characters, such as letters, numbers, and/or symbols. For instance, the data-aware tokenizer 526 may identify a group of data "00:00:00.459" as being correlated to timestamps. The identified groups of data may be heterogeneous data, which may have a combination of letters, numbers, and/or symbols and correlated to different types of data. For instance, an identified group of characters correlated to the timestamp 518 may include a combination of a number "00" and a symbol ":", and formatted in a format for timestamps, such as the timestamp 518. The data-aware tokenizer 526 may generate a token 528 for the timestamp 518 based on the identified group of characters for the timestamp 518, as depicted in FIG. 5. In some examples, the data-aware tokenizer 526 may generate one or more tokens 218 for the identified group of characters for the timestamp 518 based on the application and use case. By way of particular example, the data-aware tokenizer 526 may generate a first token 218 correlated to the date and a second token 218 correlated to the time. The data-aware tokenizer 526 may be identify groups of data as corresponding to various types of data, including IP addresses, port numbers, time stamps, protocol flags, transmission control protocol (TCP) flags, a number of bytes, a number of packets, IP protocol information, IP type of service information, and/or the like. The data-aware tokenizer 526 may assign semantic meaning to the generated tokens 218 based on the types of data.

Continuing with the particular example of FIG. 5, the data-aware tokenizer 526 may identify the timestamp 518 in the first line 510 of the text correlated to the timestamp field 504. The data-aware tokenizer 526 may group a sequence of characters correlated to the timestamp 518, based on the predefined format of the timestamp including any digits, letters, and/or symbols. For instance, the data-aware tokenizer 526 may group the characters in the text sequence "00:00:00.459", and may generate a single token 528 correlated to the grouped sequence of characters for the timestamp 518. In this particular example, the data-aware tokenizer 526 may generate 14 tokens 218 to represent the first line 510 of the network traffic data 502, as depicted in FIG. 5. Each of the 14 generated tokens 218 may have semantic meaning correlated to the identified type of data.

In some examples, the data-aware tokenizer 526 may implement tokenization based on attributes of the computing data 214, such as the type of data, components of the data, values of attributes, and/or the like. Various types of tokenization based on attributes may be possible. In some examples, tokenization based on attributes may result in fewer tokens for representing the data as well as more meaningful tokens due to maintaining semantic meaning, but may result in an increased size of the vocabulary 220.

Customized tokenization may be implemented depending on the vocabulary "budget" and the downstream task for which the LLM 208 may be used. For instance, certain types of data, such as IP addresses, may have different components that have different semantic meaning, and the tokenization of the data may be customized based on the components that are needed by downstream tasks. By way of particular example, IP addresses may have a network address portion and a host address portion. The data-aware tokenizer 526 may identify these components of the IP addresses, and may generate a separate token for each of the identified components based on a customized tokenization scheme.

By way of particular example, the processor 102 may cause the data-aware tokenizer 526 to identify the destination IP address 520 in the first line 510 of the network traffic data 502. The data-aware tokenizer 526 may identify different components of the destination IP address 520 that have different semantic meaning. For instance, in a case in which the netmask or subnet mask is 255.255.0.0, the data-aware tokenizer 526 may identify the network prefix, specifically the character sequence "192.168." as the network address component, and the host identifier, specifically the character sequence "0.1:" as the host address component of the destination IP address 520. The data-aware tokenizer 526 may generate a first token 530 for the network prefix "192.169" and a second token 532 for the host identifier "0.1".

In some examples, the data-aware tokenizer 526 may generate the two tokens for the destination IP address 520 by calculating the network address and the host address by applying a bitwise AND operation between the netmask and the destination IP address 520. In this particular example, the data-aware tokenizer 526 may separate the destination IP address 520 into the network address "192.168.0.0" and the host address "0.0.0.1", and may generate a token for each of these addresses. The generated tokens 218 may have semantic meaning correlated to the network address and the host address of the destination IP address 520, which may improve the performance of the LLM 208. In this instance, the generated tokens 218 may be new words to be added to the updated vocabulary 220, which may increase a size of the updated vocabulary 220 due to the generated tokens 218.

In some examples, the processor 102 may cause the data-aware tokenizer 526 to implement a tokenization scheme in which certain components of the data may be selectively tokenized while others components are ignored. Continuing with the particular example regarding tokenization of the destination IP address 520, in certain instances, the host address may not be needed for downstream tasks. In these instances, the data-aware tokenizer 526 may tokenize the network address "192.168.0.0" of the destination IP address 520, while discarding the host address "0.0.0.1". This method of tokenization may result in a relatively lower increase in the size of the updated vocabulary 220.

In some examples, the processor 102 may cause the data-aware tokenizer 526 to tokenize computing data 214 based on characteristics of the data 214. Continuing with the particular example in which the computing data 214 is the network traffic data 502, the port number 534 may have a characteristic in that it may be one of predefined types of ports, for example, system or well-known ports, reserved ports, and ephemeral ports. The data-aware tokenizer 526 may tokenize the port number 534 into one of three tokens corresponding to the three types of ports. This method of tokenization based on a category or type of an attribute may result in a relatively lower increase in the size of the updated vocabulary 220 since a relatively fewer number of new tokens are generated.

In some examples, certain types of data in a field, such as protocol fields or TCP flags, may have a limited number of discrete values. The data-aware tokenizer 526 may generate different tokens based on each of the discrete values. In some examples, certain types of data, such as the number of bytes or number of packets of a flow, may have values that may be discretized into levels. In some examples, the value of these levels may be determined as [log (value)]. The data-aware tokenizer 526 may tokenize each of the discrete levels as a different token. These methods of tokenization based values of an attribute may result in a relatively lower increase in the size of the updated vocabulary 220 since a relatively fewer number of new tokens are generated.

In some examples, any of the fields may be transformed in a predefined manner to generate the corresponding tokens 218. For instance, the data-aware tokenizer 526 may tokenize fields according to a tokenizing function, which may be expressed by an equation: $t_i=f(x_i)$, where $x_i$ is a particular data field that includes one or more bytes, f( ) is the tokenizing function, and $t_i$ is the set of tokens 218 returned for the field $x_i$. In some examples, $t_i$ may be null, for instance the field is ignored, or may include any number of tokens depending on the semantic interpretation of field $x_i$.

In block 312, the processor 102 may fine-tune the LLM 208 based on the generated tokens 218. In block 314, the processor 102 may fine-tune a pre-trained LLM 224. The pre-trained LLM 224 may be a version of the LLM 208 before fine-tuning and the fine-tuned LLM 226 may be a version of the LLM 208 after fine-tuning. The pre-trained LLM 224 may be a language model that has been trained on relatively very large textual datasets. In some examples, the dataset used to train the pre-trained LLM 224 may have trillions of words or more. The textual datasets may be based on various types of sources such as the Internet, books, periodicals, encyclopedias, and/or the like. The performance of the pre-trained LLM 224 may increase as the scale of the training dataset is increased. However, training the pre-trained LLM 224 on such a large training dataset may require a relatively very large amount computing resources. While the present disclosure describes using a pre-trained LLM 224 to fine-tune for computing data 214, which may enable faster learning through fine-tuning, the present disclosure is not limited to using pre-trained LLMs. In some examples, the processor 102 may train a machine learning model from the starting point using a large text and computing data dataset, provided that a sufficient amount of computing resources are available.

The processor 102 may fine-tune the LLM 208 on the computing data 214 to enable the LLM 208 to learn tasks for the computing data 214 via in-context learning. Fine-tuning the LLM 208 may involve training the pre-trained LLM 224 on a relatively small, task-specific text dataset, with the goal of adapting the weights of the pre-trained LLM 224 to new tasks. Fine-tuning may produce improved results for downstream tasks than without fine-tuning.

In many instances, the training dataset that is used to initially train or fine-tune the pre-trained LLM 224 may be homogeneous, that is, the training dataset may be made up of mainly words. The processor 102 may fine-tune the pre-trained LLM 224 on the computing data 214 to enable the LLM 208 to produce relatively more accurate results for tasks related to the computing data 214. As previously discussed, the computing data 214 may be heterogeneous data, such as network traffic data 502 as depicted in FIG. 5, which may include specialized fields for different types of data such as timestamps, IP addresses, port numbers, and/or the like. Fine-tuning the pre-trained LLM 224 on a specific type of heterogeneous data, such as the network traffic data 502, may improve performance of the fine-tuned LLM 226 in performing tasks related to the specific type of heterogeneous data.

During fine-tuning, the processor 102 may input the generated tokens 218 into the LLM 208. Continuing with the particular example in which the computing data 214 is the network traffic data 502 depicted in FIG. 5, the processor 102 may input the generated tokens 218, which are tokenized based on types of data in the network traffic data 502, into the pre-trained LLM 224. As previously discussed, the generated tokens 218 may be based on a sequence of characters correlated to a type of data, such as the network prefix of an IP address. These generated tokens 218 may represent new words that are not present in the pre-trained vocabulary 222 of the pre-trained LLM 224. During fine-tuning, the processor 102 may incorporate the new generated tokens 218 into the pre-trained vocabulary 222. As the new tokens are incorporated into the pre-trained vocabulary 222, a vocabulary size of the updated vocabulary 220 may be increased based on the added generated tokens 218, such that a size of the updated vocabulary 220 after fine-tuning may be greater than a size of the pre-trained vocabulary 222 of the pre-trained LLM 224 before fine-tuning.

During fine-tuning, as new tokens are added to the pre-trained LLM 224, weights in pre-trained LLM 224 may be changed to reflect the added tokens. In some examples, select weights may be updated during fine-tuning depending on the size of the training dataset and the amount of computing resources available. For instance, weights in certain layers of the architecture of the pre-trained LLM 224 may be updated, while weights in other layers may be "frozen."

The pre-trained LLM 224 may be built on a predefined architecture, such as a transformer architecture. In some examples, the LLM 208 may have a large language model architecture 600 depicted in FIG. 6 based on the transformer architecture. The LLM architecture 600 may include an input embedding layer 602, in which the generated tokens 218 may be transformed into an embedding, which is a low dimensional, dense vector. The input embedding layer 602 may map sparse tokens to a dense embedding. The processor 102 may introduce new weights corresponding to the generated tokens 218 in the updated vocabulary 220 to account for the increased size of the updated vocabulary 220. The processor 102 may update at least one layer of the LLM 208 to include weights for the generated tokens 218 to fine-tune the pre-trained LLM 224. In some examples, the processor 102 may freeze the original weights, and hence the embeddings, in the pre-trained vocabulary 222, and update the weights corresponding to the new generated tokens 218. In this regard, a size of the at least one updated layer may be increased to accommodate the weights for the generated tokens 218.

In some examples, the LLM architecture 600 may include a softmax layer 604 and a linear layer 606 as depicted in FIG. 6. The softmax layer 604 may convert a vector into a probability distribution of possible outcomes, which may be used to predict the next token. The linear layer 606 in a neural network may perform a linear transformation on an input, and may map the input to an output. The linear layer 606 may be used to learn the weights to map the input to the output.

The processor 102 may update the weights in the softmax layer 604 and the linear layer 606 based on the generated tokens 218. In some examples, the processor 102 may update all weights in the softmax layer 604 and the linear layer 606, and in these instances none of the weights in the softmax layer 604 and the linear layer 606 are be "frozen." In some examples, the processor 102 may freeze weights in all of the layers of the LLM architecture 600, then unfreeze select layers to update the weights from the top of the LLM architecture to the bottom, based on the performance of the fine-tuned LLM 226. The determinations of the layers to be unfrozen for updates may be user-defined, based on historical data, experimentation, modeling, and/or the like.

The processor 102 may fine-tune the pre-trained LLM 224 via self-supervised learning using the computing data 214, such as the network traffic data 502 depicted in FIG. 5. The network traffic data 502 for self-supervised learning in the pre-trained LLM 224 may be un-labelled data. As previously described, self-supervised learning is a machine learning paradigm for processing unlabeled data, for instance data that do not require human annotated labels, to obtain useful representations that can help with downstream learning tasks. The computing data 214 may be un-labelled data, which is not annotated by a user or a machine learning model, and thus may be helpful in instances where a large amount of labeled data is not readily available.

Figure 7:
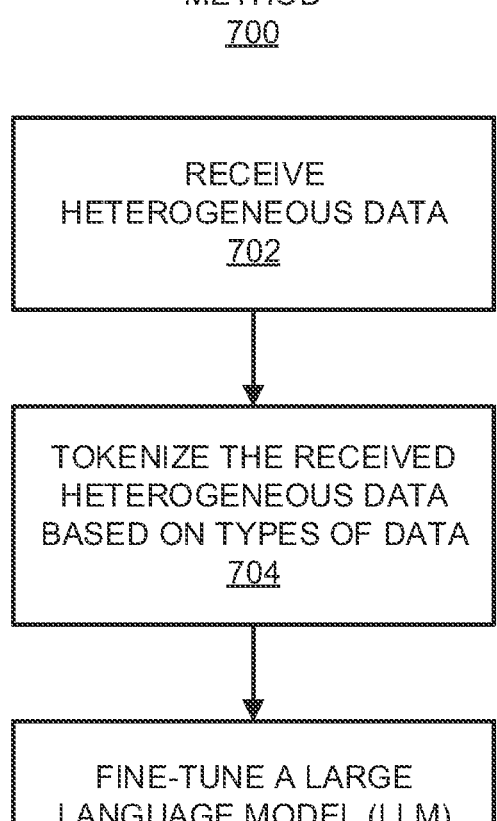
FIG. 7 depicts a flow diagram of an example method for fine-tuning an LLM based on data-type-aware tokenization.

Various manners in which the processor 102 of the apparatus 100 may operate are discussed in greater detail with respect to the method 700 depicted in FIG. 7. Particularly, FIG. 7 depicts a flow diagram of an example method 700 for fine-tuning an LLM 208 based on data-aware tokenization. It should be understood that the method 700 depicted in FIG. 7 may include additional operations and that some of the operations described therein may be removed and/or modified without departing from the scope of the method 700. The description of the method 700 is made with reference to the features depicted in FIGS. 1-6 for purposes of illustration.

At block 702, the processor 102 may receive heterogeneous data that includes a plurality of types of data. The heterogeneous data may be the same as the computing data 214 depicted in FIG. 2 and the network traffic data 502 depicted in FIG. 5. Continuing with the particular example previously discussed in which the computing data 214 is the network traffic data 502, the processor 102 may receive the network traffic data 502 as text in a data log.

At block 704, the processor 102 may tokenize the received heterogeneous data to generate tokens. The tokens may be the same as the generated tokens 218 depicted in FIG. 2. The processor 102 may tokenize the received heterogeneous data based on the plurality of types of data. Continuing with the particular example, the processor 102 may tokenize the network traffic data 502 based on data-aware tokenization depicted in FIG. 5.

The processor 102 may generate the tokens 218 correlated to one of the plurality of types of data. In some examples, the plurality of types of data may include IP addresses, port numbers, time stamps, protocol flags, TCP flags, a number of bytes, a number of packets, and/or the like.

The processor 102 may identify a field correlated to a type of data among the plurality of types of data in the received heterogeneous data. Continuing with the particular example, the processor 102 may identify the destination IP address field 506 correlated to the destination IP address 520 in the network traffic data 502. The processor 102 may identify a sequence of characters correlated to the identified field, namely the characters correlated to the destination IP address 520 "192.168.0.1". The processor 102 may group the identified sequence of characters to generate a token among the tokens. For instance, the processor 102 may generate a token for the destination IP address 520 based on the identified sequence of characters for the destination IP address 520, specifically one token for the series of characters "192.168.0.1". The generated token may have a semantic value based on the type of data correlated to the identified field, for instance, a semantic meaning to destination IP addresses. In some examples, the processor 102 may generate multiple tokens for a data type based on attributes of the data type. For instance, the processor 102 may generate the first token 530 correlated to the network address portion of the destination IP address 520 and the second token 532 correlated to the host address portion of the destination IP address 520, as depicted in FIG. 5.

The processor 102 may identify a field correlated to a type of network traffic data 502 among the plurality of types of data in the received heterogeneous data. The type of network traffic data 502 may include IP addresses, port numbers, time stamps, protocol flags, TCP flags, a number of bytes, a number of packets, IP protocol information, IP type of service information, and/or the like. For instance, continuing with the particular example of the network traffic data 502 in FIG. 5, the processor 102 may identify the destination IP address field 506 correlated to destination IP addresses in a network traffic data log. The processor 102 may identify a sequence of characters in the identified field, such as the digits and symbols that make up the destination IP address 520 as depicted in FIG. 5. The processor 102 may group the identified sequence of characters into predefined groups of characters based on the type of network traffic data. For instance, the processor 102 may group the characters of the destination IP address 520 into a network address portion and a host address portion. The processor 102 may generate a token for each of the predefined groups of characters, such as the first token 530 for the network address and the second token 532 for the host address, as depicted in FIG. 5. Each of the generated tokens, such as the first and second tokens 530 and 532, may have a semantic value correlated to a respective one of the predefined groups of characters.

At block 706, the processor 102 may fine-tune an LLM, such as the LLM 208 depicted in FIG. 2, using the tokenized heterogeneous data. The processor 102 may input the generated tokens 218 into the LLM 208 to fine-tune the LLM 208. The processor 102 may add the generated tokens 218 to a vocabulary of the LLM 208, such as the pre-trained vocabulary 222, during fine-tuning. The vocabulary size of the LLM 208 may be increased during the fine-tuning based on the generated tokens 218, for instance, increased in size from the pre-trained vocabulary 222 before fine-tuning to the updated vocabulary 220 after fine-tuning.

The vocabulary of the LLM 208, for instance the pre-trained vocabulary 222, may be a natural language vocabulary. The processor 102 may add the generated tokens 218 to the natural language vocabulary of the LLM 208 during the fine-tuning. For instance, the processor 102 may initiate fine-tuning on the pre-trained LLM 224, and update the pre-trained vocabulary 222 by adding new words correlated with the generated tokens 218 based on network traffic data 502 to result in the updated vocabulary 220. The vocabulary size of the LLM 208 may be increased during the fine-tuning based on the generated tokens 218. For instance, the size of the updated vocabulary 220 may be greater than the size of the pre-trained vocabulary 222 based on the added generated tokens 218.

In some examples, the processor 102 may fine-tune the LLM 208 via self-supervised learning using the received heterogeneous data. The received heterogeneous data for self-supervised learning may be un-labelled data. For instance, the processor 102 may fine-tune the pre-trained LLM 224 based on the network traffic data 502, which may be un-labelled data from a data log.

The processor 102 may receive a prompt 206 for the fine-tuned LLM 226. In some examples, the prompt 206 may be an in-context learning prompt such as the few-shot learning prompt 400 depicted in FIG. 4. The received prompt 206 may include a query 210 to perform a task on the network traffic data 502. The processor 102 may cause the fine-tuned LLM 226 to learn the task based on in-context learning in the fine-tuned LLM 226. The processor 102 may output a completion 212 in response to the query 210 in the received prompt 206. The processor 102 may generate the completion 212 to include a response 216 to the query generated by the fine-tuned LLM 226 via the in-context learning.

In some examples, the processor 102 may receive a few-shot prompt, such as the few-shot learning prompt 400 depicted in FIG. 4, to learn a task to be performed through few-shot learning in the fine-tuned LLM 226. The few-shot learning prompt 400 may include a training query, such as the first training query 404, and a training response correlated to the training query, such as the first training response 406 depicted in FIG. 4. The training query and the training response may form a training example, such as the first training query/response pair 402. In some examples, the few-shot prompt may include additional training examples, such as the second training query/response pair 412.

The few-shot prompt may include a task query, such as the task query 420 depicted in FIG. 4. In some examples, the task query may include a blank response 422. The blank response 422 may include a tag 424 without a corresponding value. For instance, the task query in the few-shot prompt may include the task query 420 in combination with the "Label" tag 424 and the blank space 426 as depicted in FIG. 4. In response to the received few-shot prompt, the processor 102 may generate an output response correlated to the task query via the in-context learning in the fine-tuned LLM 226. The output response may be the same as the output response 428, which is output in response to the task query 420 and correlated to the blank space 426. The processor 102 may output a completion, such as the completion 212 depicted in FIG. 2, in response to the received few-shot prompt. The completion 212 may include the generated output response 428 correlated to the task query 420 and the blank response 422 in the task query/response pair 418, as depicted in FIG. 4.

In some examples, the method 700 depicted in FIG. 7 may include additional operations. For instance, at block 706, the processor 102 may fine-tune the LLM 208 multiple times, on multiple data sets. In other examples, the processor 102 may enable reinforcement learning, for instance, based on human feedback.

Some or all of the operations set forth in the method 700 may be included as utilities, programs, or subprograms, in any desired computer accessible medium. In addition, the method 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 8, there is depicted a block diagram of an example computer-readable medium 800 that has stored thereon machine readable instructions that when executed by a processor, may cause the processor to fine-tune a pre-trained LLM 224 based on network traffic data 502, and process tasks via few-shot learning inputs through in-context learning in the fine-tuned LLM 226. It should be understood that the computer-readable medium 800 depicted in FIG. 8 may include additional instructions and that some of the instructions described herein may be removed and/or modified without departing from the scope of the computer-readable medium 800 disclosed herein. The computer-readable medium 800 may be a non-transitory computer readable medium. The term "non-transitory" does not encompass transitory propagating signals.

The computer-readable medium 800 may have stored thereon machine readable instructions 802-810 that a processor, such as the processor 102 depicted in FIGS. 1 and 2, may execute. The computer-readable medium 800 may be an electronic, magnetic, optical, or other physical storage device that contains or stores executable instructions. The computer readable medium 800 may be, for example, Random Access memory (RAM), an Electrically Erasable Programmable Read-Only Memory (EEPROM), a storage device, an optical disc, and the like.

The processor may fetch, decode, and execute the instructions 802 to receive network traffic data 502 in a network traffic log. The network traffic data 502 may be the same as computing data 214 depicted in FIG. 2.

The processor may fetch, decode, and execute the instructions 804 to tokenize the received network traffic data 502 based on types of data in the received network traffic data 502. The processor may generate tokens 218 for the received network traffic data 502 to have semantic meaning correlated to the types of data.

The processor may fetch, decode, and execute the instructions 806 to fine-tune an LLM 208 using the generated tokens 218. The LLM 208 may be the pre-trained LLM 224 having the pre-trained vocabulary 222, which may be fine-tuned to result in the fine-tuned LLM 226 having the updated vocabulary 220, as depicted in FIG. 2. The fine-tuned LLM 226 may have a vocabulary size, which may be greater than a vocabulary size of the pre-trained LLM 224, based on addition of the generated tokens 218 into the updated vocabulary 220 of the fine-tuned LLM 226.

The processor may fetch, decode, and execute the instructions 808 to receive an input to learn a task to be performed on the network traffic data 502. The input may be the few-shot learning prompt 400 depicted in FIG. 4. The processor may cause the fine-tuned LLM 226 to learn the task based on the input by few-shot learning via in-context learning in the fine-tuned LLM 226.

The processor may fetch, decode, and execute the instructions 810 to generate an output in response to the received few-shot learning input, by applying the learned task on the network traffic data 502 via the in-context learning in the fine-tuned LLM 226. The output may be the same as the completion 212 depicted in FIG. 2, which may include the output response 428 to the few-shot learning prompt 400 depicted in FIG. 4.

The processor may identify a field correlated to a type of network traffic data among the types of data in the network traffic log. The type of network traffic data may include IP addresses, port numbers, time stamps, protocol flags, TCP flags, a number of bytes, a number of packets, IP protocol information, IP type of service information, and/or the like. The processor may identify a sequence of characters in the identified field. For instance, the identified sequence of characters may include each of the characters, including digits and dots, that make up the destination IP address 520 depicted in FIG. 5. The processor may group the identified sequence of characters into predefined groups of characters based on the type of network traffic data. For instance, the processor may group the sequence of characters "1", "9", "2", ".", "1", "6", "8", and "." correlated to the network address portion of the destination IP address 520. The processor may generate a token for each of the predefined groups of characters, for instance, a first token 530 for the network prefix and a second token 532 for the host identifier, depicted in FIG. 5. Each of the generated tokens 218 may have a semantic value correlated to a respective one of the predefined groups of characters.

The processor may fine-tune the LLM 208 via self-supervised learning using the tokenized network traffic data 502. The tokenized network traffic data 502 for self-supervised learning may be un-labelled data. The processor may receive a few-shot learning input as an input for the LLM 208. The few-shot learning input may be the same as the few-shot learning prompt 400 depicted in FIG. 4. The few-shot learning prompt 400 may include a first training query/response pair 402, which may include a first training query 404 and a first training response 406 correlated to the first training query 404. The few-shot learning prompt 400 may include a task query/response pair 418, which may include a task query 420 and a blank response 422 correlated to the task query 420. The task query/response pair 418, or the task query 420, may be a test input for the fine-tuned LLM 226. In response to the received few-shot learning prompt 400, the processor 102 may generate an output response 428 correlated to the task query 420 via the in-context learning in the fine-tuned LLM 226. The fine-tuned LLM 226 may be a machine learning model that is not pre-trained for the task correlated to the task query 420, and may learn the task in the task query 420 based on the training example provided in the received input, such as the first training query/response pair 402 that includes the first training query 404 and the first training response 406.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
receive a prompt for a large language model (LLM), the received prompt comprising a query to perform a task on unlabeled heterogenous computing data through in-context learning in the LLM;
receive, as part of in-context learning, the unlabeled heterogeneous computing data, the unlabeled heterogeneous computing data comprising one or more different types of data, differently formatted data, and data having different types of characters;
extract, as part of in-context learning, first but not second unlabeled heterogeneous computing data from the receive labeled heterogeneous computing data;
group, as part of in-context learning, the extracted first unlabeled heterogeneous computing data into subgroups of data having different semantic meanings, each subgroup of data corresponding to a respective one or more of type data, data format, and character type;
assign, as part of in-context learning, a token to each subgroup of data, wherein a semantic value for each token is different for different ones of the one or more of different types of data, differently formatted data, and data having different types of characters; and
cause the LLM to output a completion in response to the query for the task, the completion being generated by performing a learned task on the unlabeled heterogeneous computing data in the LLM.

2. The apparatus of claim 1, wherein the instructions cause the processor to:
receive a few-shot prompt for few-shot learning to learn the task through the in-context learning in the LLM, wherein the few-shot prompt comprises a training query to be performed on the unlabeled heterogeneous computing data, a training response correlated to the training query, and a task query to be performed on the unlabeled heterogeneous computing data;

in response to the received few-shot prompt, generate an output response correlated to the task query, the task query being learned in the LLM via the in-context learning based on the training query and the training response in the few-shot prompt; and output the completion comprising the generated output response correlated to the task query.

3. The apparatus of claim 1, wherein the received unlabeled heterogeneous computing data comprises network traffic data, wherein each of the subgroups of data correspond to homogeneous computing data and wherein the received prompt for the in-context learning comprises a first portion in a natural language format and a second portion in a network traffic data format.

4. The apparatus of claim 1, wherein the received unlabeled homogeneous computing data comprises network traffic data and wherein the instructions cause the processor to:

input generated tokens into the LLM to fine-tune the LLM on the network traffic data, the LLM being updated to include the generated tokens in a vocabulary of the LLM during the fine-tuning, wherein a vocabulary size of the LLM is increased during fine-tuning based on the generated tokens.

5. The apparatus of claim 4, wherein in-context learning ignores second network traffic data, wherein the one or more of different types of data, differently formatted data, and data having different types of characters comprises different types of data and different types of characters and wherein the instructions cause the processor to:

identify subgroups of data in first network traffic data correlated to the different types of data, the identified subgroups of data being heterogeneous data comprising a combination of letters, numbers, and/or symbols; and generate tokens based on the identified subgroups of data.

6. The apparatus of claim 4, wherein in-context learning ignores second network traffic data, wherein the one or more of different types of data, differently formatted data, and data having different types of characters comprises different types of data and different types of characters and wherein the instructions cause the processor to:

identify characters in first network traffic data correlated to the different types of data; and generate tokens based on subgroups of the identified characters correlated to the different types of data, the different types of data comprising internet protocol (IP) addresses, port numbers, time stamps, protocol flags, transmission control protocol (TCP) flags, a number of bytes, a number of packets, IP protocol information, or IP type of service information, wherein the generated tokens have semantic meaning based on the different types of data.

7. The apparatus of claim 4, wherein the instructions cause the processor to:

incorporate the assigned tokens for first network traffic data into a natural language vocabulary of the LLM during the fine-tuning, wherein a size of the natural language vocabulary of the LLM is increased during the fine-tuning based on the generated tokens for the network traffic data.

8. The apparatus of claim 7, wherein the instructions cause the processor to:

update at least one layer of an architecture of the LLM to include weights for the generated tokens to fine-tune the LLM, a size of the updated at least one layer being increased to accommodate the weights for the generated tokens.

9. The apparatus of claim 1, wherein the instructions cause the processor to:

receive the unlabeled heterogeneous computing data to fine-tune the LLM, the unlabeled heterogeneous computing data comprising network traffic data that includes a combination of letters, numbers, and/or symbols; and fine-tune the LLM via self-supervised learning using the first unlabeled heterogeneous computing data, wherein in-context learning ignores the second unlabeled heterogeneous data and wherein the network traffic data for self-supervised learning in the LLM comprises unlabeled data.

10. A method comprising:

receiving, by a processor, unlabeled heterogeneous data, the unlabeled heterogeneous data comprising one or more of different types of data, differently formatted data, and data having different types of characters;

extracting, by the processor, first but not second heterogeneous data from the unlabeled heterogeneous data;

grouping, by the processor, the extracted first heterogeneous data into subgroups of homogenous data having different semantic meanings, each group of homogenous data corresponding to a different one of type of data, data format, and/or character type and semantic values;

assigning, by the processor, a token to each subgroup of homogenous data to form tokenized first homogeneous data, the tokens assigned to the subgroups of homogeneous data having different semantic values; and fine-tuning, by the processor, a large language model (LLM) using the tokenized first homogenous data, the assigned tokens being added to a natural language vocabulary of the LLM during the fine-tuning, wherein a vocabulary size of the LLM is increased during the fine-tuning based on the assigned tokens.

11. The method of claim 10, further comprising:

generating the tokens correlated to the one or more of different types of data, differently formatted data, and data having different types of characters, wherein the one or more of different types of data, differently formatted data, and data having different types of characters comprise internet protocol (IP) addresses, port numbers, time stamps, protocol flags, transmission control protocol (TCP) flags, a number of bytes, or a number of packets.

12. The method of claim 10, further comprising:

identifying a field correlated to a selected one of the one or more of different types of data, differently formatted data, and data having different types of characters in the received unlabeled heterogeneous data;

identifying a sequence of characters correlated to the identified field; and grouping the identified sequence of characters to generate a token among the tokens, wherein the generated token has a semantic value based on the selected one of the one or more of different types of data, differently formatted data, and data having different types of characters correlated to the identified field.

13. The method of claim 10, wherein the received unlabeled heterogeneous data comprises network traffic data and further comprising:

identifying a field correlated to a selected one of the one or more of different types of data, differently formatted data, and data having different types of characters in the received unlabeled heterogeneous data, the one of the one or more of different types of data, differently formatted data, and data having different types of characters comprising internet protocol (IP) addresses, port numbers, time stamps, protocol flags, transmission control protocol (TCP) flags, a number of bytes, a number of packets, IP protocol information, or IP type of service information;

identifying a sequence of characters in the identified field; and grouping the identified sequence of characters into predefined subgroups of characters based on type of network traffic data; and generating a token for each of the predefined subgroups of characters, wherein each generated tokens has a semantic value correlated to a respective one of the predefined subgroups of characters; and inputting each generated token into the LLM to fine-tune the LLM, each generated token being added to a vocabulary of the LLM during fine-tuning, wherein a vocabulary size of the LLM is increased during the fine-tuning based on the generated tokens.

14. The method of claim 10, further comprising:

fine-tuning the LLM via self-supervised learning using the received unlabeled heterogeneous data, wherein the received unlabeled heterogeneous data for self-supervised learning comprises unlabeled data.

15. The method of claim 10, wherein the received unlabeled heterogeneous data comprises network traffic data and further comprising:

receiving a prompt for the fine-tuned LLM, the received prompt comprising a query to perform a task on network traffic data, wherein the task is learned based on in-context learning in the fine-tuned LLM; and output a completion in response to the query in the received prompt, the completion comprising a response to the query generated by the fine-tuned LLM via the in-context learning.

16. The method of claim 10, further comprising:

receiving a few-shot prompt to learn a task to be performed through few-shot learning in the fine-tuned LLM, wherein the few-shot prompt comprises a training query, a training response correlated to the training query, and a task query;

in response to the received few-shot prompt, generate an output response correlated to the task query via in-context learning in the fine-tuned LLM; and output a completion in response to the received few-shot prompt comprising the generated output response correlated to the task query.

17. A non-transitory computer-readable medium having computer-readable instructions that, when executed by a processor, cause the processor to:

receive network traffic data in a network traffic log, the network traffic data being unlabeled and comprising a plurality of different types of data, differently formatted data, and data having different types of characters;

extract first but not second data from the network traffic data;

group the extracted first data into subgroups of heterogeneous data having different semantic meanings, each subgroup of data homogenous data corresponding to a different one of type of data, data format, and/or character type and semantic values;

assign a token to each subgroup of homogenous data, the tokens assigned to the subgroups of homogeneous data having different semantic values;

fine-tune a large language model (LLM) using the assigned tokens, the fine-tuned LLM comprising a vocabulary size, which is greater than a vocabulary size of the LLM, based on addition of the assigned tokens into a vocabulary of the fine-tuned LLM;

receive an input to learn a task to be performed on the network traffic data, the task being learned by few-shot learning via in-context learning in the fine-tuned LLM; and in response to the received input, generate an output by applying a learned task on the network traffic data via the in-context learning in the fine-tuned LLM.

18. The non-transitory computer-readable medium of claim 17, wherein plurality of different types of data, differently formatted data, and data having different types of characters comprise a type of network traffic data and wherein the instructions cause the processor to:

identify a field correlated to the type of network traffic data among the plurality of different types of data in the network traffic log, the type of network traffic data comprising internet protocol (IP) addresses, port numbers, time stamps, protocol flags, transmission control protocol (TCP) flags, a number of bytes, a number of packets, IP protocol information, and/or IP type of service information;

identify a sequence of characters in the identified field; and group the identified sequence of characters into predefined subgroups of characters based on the type of network traffic data; and generate a token for each of the predefined subgroups of characters, wherein each generated token has a semantic value correlated to a respective one of the predefined subgroups of characters.

19. The non-transitory computer-readable medium of claim 17, wherein the instructions cause the processor to:

fine-tune the LLM via self-supervised learning using tokenized network traffic data, wherein the tokenized network traffic data for self-supervised learning is unlabeled data.

20. The non-transitory computer-readable medium of claim 17, wherein the instructions cause the processor to:

receive a few-shot learning prompt as the input, wherein the few-shot learning prompt comprises a training query, a training response correlated to the training query, and a task query; and in response to the received few-shot learning prompt, generate an output response correlated to the task query via the in-context learning in the fine-tuned LLM, wherein the fine-tuned LLM is not pre-trained for the task query.

* * * * *